United States Patent
Longtin et al.

(10) Patent No.: US 7,944,074 B2
(45) Date of Patent: May 17, 2011

(54) WIND TURBINE DIRECT DRIVE AIRGAP CONTROL METHOD AND SYSTEM

(75) Inventors: Randy S. Longtin, Schenectady, NY (US); Patrick L. Jansen, Scotia, NY (US)

(73) Assignee: General Electric Company, Schenectady, NY (US)

( * ) Notice: Subject to any disclaimer, the term of this patent is extended or adjusted under 35 U.S.C. 154(b) by 503 days.

(21) Appl. No.: 12/054,862

(22) Filed: Mar. 25, 2008

(65) Prior Publication Data

US 2009/0243301 A1    Oct. 1, 2009

(51) Int. Cl.
*F03D 9/00* (2006.01)

(52) U.S. Cl. .................. 290/55; 290/44; 310/90

(58) Field of Classification Search .......... 290/44, 290/55; 310/90, 254.1, 261.1
See application file for complete search history.

(56) References Cited

U.S. PATENT DOCUMENTS

| | | | |
|---|---|---|---|
| 7,042,109 | B2 | 5/2006 | Gabrys |
| 7,180,204 | B2 | 2/2007 | Grant et al. |
| 7,696,459 | B2 * | 4/2010 | Harnoy .................. 244/3.1 |
| 7,768,166 | B2 * | 8/2010 | Lafontaine et al. ......... 310/90 |
| 2005/0127782 | A1 * | 6/2005 | Endo et al. ............ 310/323.02 |
| 2008/0007130 | A1 * | 1/2008 | Edelson .................. 310/82 |
| 2008/0164697 | A1 * | 7/2008 | Schram et al. ............ 290/44 |

* cited by examiner

*Primary Examiner* — Michael C Zarroli
(74) *Attorney, Agent, or Firm* — McNees Wallace & Nurick LLC

(57) ABSTRACT

A deflection resistant wind turbine generator having a stator arranged about an axis and a rotor operably mounted with respect to the stator to generate electricity. The rotor is rotatably communicating with wind turbine blades rotating substantially about the axis and the rotor and the stator are configured to maintain an airgap therebetween. The stator and the rotor have selectively engageable surfaces that maintain a substantially stable airgap and permit rotation of the rotor during engagement. The engageable surfaces engage when the rotor deflects to a predetermined amount of deflection.

14 Claims, 5 Drawing Sheets

WIND TURBINE DIRECT DRIVE AIRGAP CONTROL METHOD AND SYSTEM

FIELD OF THE INVENTION

This invention relates generally to electric generators, and more particularly, to methods and systems for controlling an airgap between a rotor and a stator in a wind-powered turbine generator.

BACKGROUND OF THE INVENTION

Recently, wind turbines have received increased attention as an environmentally safe and a relatively inexpensive alternative energy source. With this growing interest, considerable efforts have been made to develop wind turbines that are reliable and efficient.

Generally, a wind turbine includes a plurality of blades coupled to a hub forming a turbine rotor. Utility grade wind turbines (i.e. wind turbines designed to provide electrical power to a utility grid) can have large turbine rotors (e.g., seventy or more meters in diameter). Blades on these turbine rotors transform wind energy into a rotational torque or force that drives a rotor of one or more generators. The turbine rotor is supported by the tower through a set of internal bearings that include a fixed portion coupled to a rotatable portion. The set of internal bearings is subject to a plurality of loads including the weight of the turbine rotor, a moment load of the turbine rotor that is cantilevered from the set of internal bearings, symmetric and asymmetric wind loads loads, such as, horizontal and shears, yaw misalignment, and natural turbulence.

In a direct drive wind turbine generator, the generator rotor is directly coupled to the turbine rotor. The generator rotor and stator are separated by an airgap. During operation, a magnetic field generated by permanent magnets or an excited wound field mounted on the generator rotor passes through the airgap between the rotor and the stator. The passage of the magnetic field through the airgap is at least partially dependent on the uniformity of the airgap. Asymmetric and/or transient loads on the generator may be introduced through the turbine rotor from the blades. Such loads are transmitted from the turbine rotor to the wind turbine base through the set of internal bearings and may tend to deflect structural components of the generator rotor and stator in the load path such that the airgap distance is reduced and/or made non-uniform. One proposed solution includes fabricating wind turbine components from stiffer and/or stronger materials capable of withstanding the loads on the rotor. However, the size and/or weight drawbacks of stiffer and/or stronger materials and/or components make their use prohibitive. Additionally, the substantial structure needed to control the airgap would use up valuable hub-access space needed to install and service systems such as pitch-control and other devices.

Thus, what is needed is a method and system to provide a wind turbine generator having an arrangement of a rotor and a stator that provides airgap stability.

SUMMARY OF THE INVENTION

One aspect of the disclosure includes a wind turbine generator having a stator arranged about an axis and a rotor operably mounted with respect to the stator to generate electricity. The rotor is rotatably communicating with wind turbine blades rotating substantially about the axis and the rotor and the stator are configured to maintain an airgap therebetween. The stator and rotor have selectively engageable surfaces that maintain a substantially stable airgap and permit rotation of the rotor during engagement. The engageable surfaces engage when the rotor deflects to a predetermined amount of deflection.

Another aspect of the disclosure includes a method for maintaining a stable airgap in a wind turbine generator. The method includes providing a wind turbine generator having a stator arranged about an axis and a rotor operably mounted with respect to the stator to generate electricity. The rotor is rotatably communicating with wind turbine blades rotating substantially about the axis. The rotor and the stator are configured to maintain an airgap therebetween. The method further includes engaging the engageable surfaces to maintain a substantially stable airgap and permit rotation of the rotor when the rotor deflects to a predetermined amount of deflection.

One advantage of the present deflection resistant system and method is that the components do not significantly add to the weight or space within the wind turbine and provide deflection resistance without loss of operational or power capacity.

Another advantage is that the components do not increase rotational resistance when little or no deflection of the rotor is present.

Another advantage is that the stator mechanical stiffness may be improved without increasing sectional moments of inertia. This improved stiffness reduces the relative deflections between the rotor and the stator induced by bending loads.

Another advantage is that the structural mass may be significantly reduced leading to a cost reduction in the generator frame.

Another advantage includes electromagnet airgap variation reduction by selectively coupling the stator and the rotor frames so that the stator and the rotor frames deflect at the same time as opposed to independently. This advantage exists because gravity loads may dominate the deflections on the stator whereas wind loads that oppose gravity loads may dominate the deflection on the rotor. This concurrent deflection ensures that the rotor and the stator respond to the wind load such that the generator (including the rotor and the stator frames) bulk deformation is in the same direction.

Another advantage is that the disclosure beneficially provides an additional control variable that can be used to shift the natural frequencies of the generator frames by adjusting stiffness.

Another advantage is that the selective coupling serves as an alternate load path between the rotor and the stator.

Another advantage is that the system of the present disclosure may be retrofitted to direct drive wind turbines in the field.

Another advantage is that the system of the present disclosure permits the use of lighter generators. Among other benefits, lighter generators permit use of smaller capacity cranes to be used during wind turbine assembly in the field.

Further aspects of the method and system are disclosed herein. The features as discussed above, as well as other features and advantages of the present invention will be appreciated and understood by those skilled in the art from the following detailed description and drawings.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
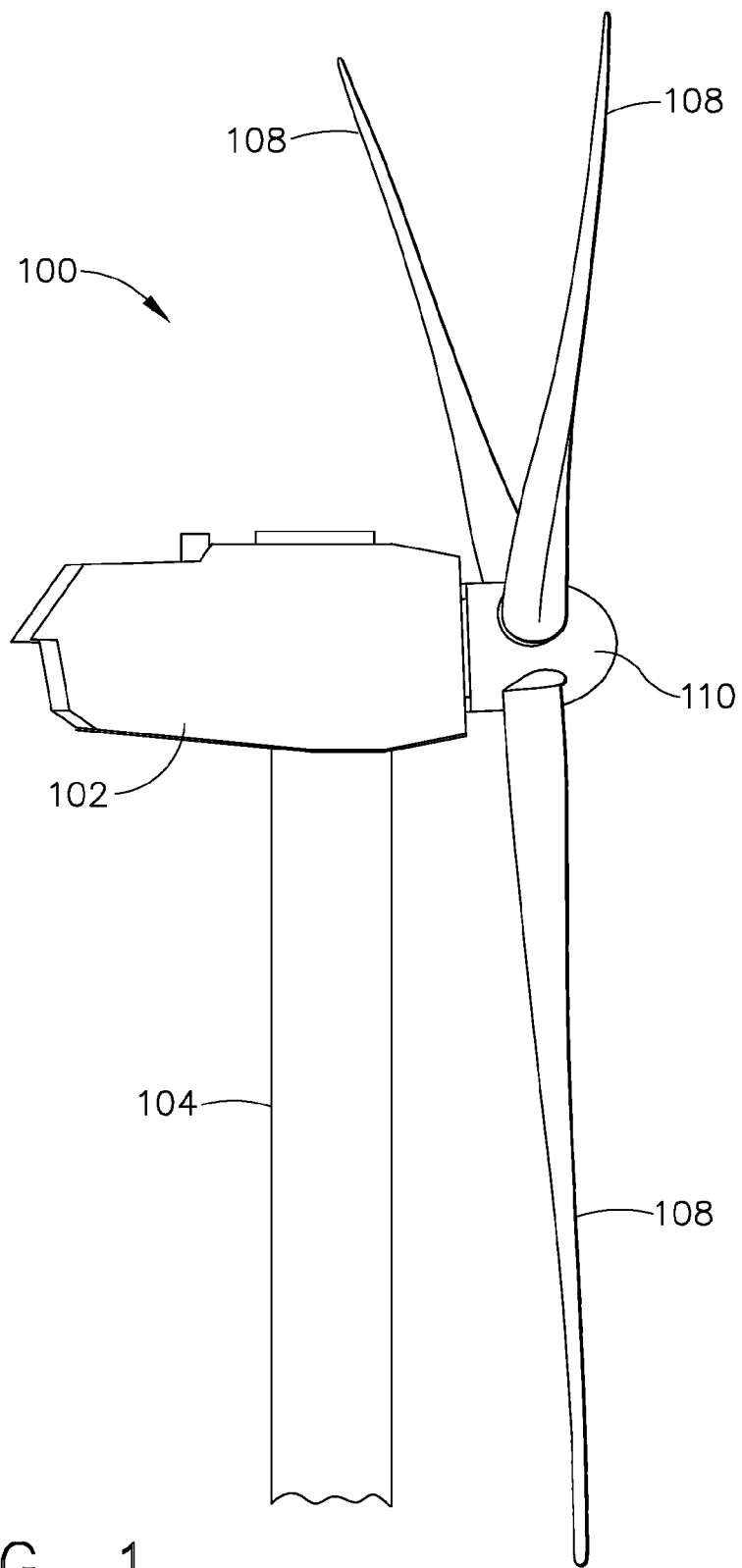
FIG. 1 is a side view of a wind turbine according to an embodiment of the present disclosure.

As shown in FIG. 1, a wind turbine 100 generally comprises a nacelle 102 housing a generator (not shown in FIG. 1). The nacelle 102 is a housing mounted atop a tower 104, only a portion of which is shown in FIG. 1. The height of the tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. The wind turbine 100 also comprises one or more rotor blades 108 attached to a rotating hub 110. Although the wind turbine 100 illustrated in FIG. 1 includes three of the one or more rotor blades 108, there are no specific limits on the number of the one or more rotor blades 108 required by the present invention.

Figure 2:
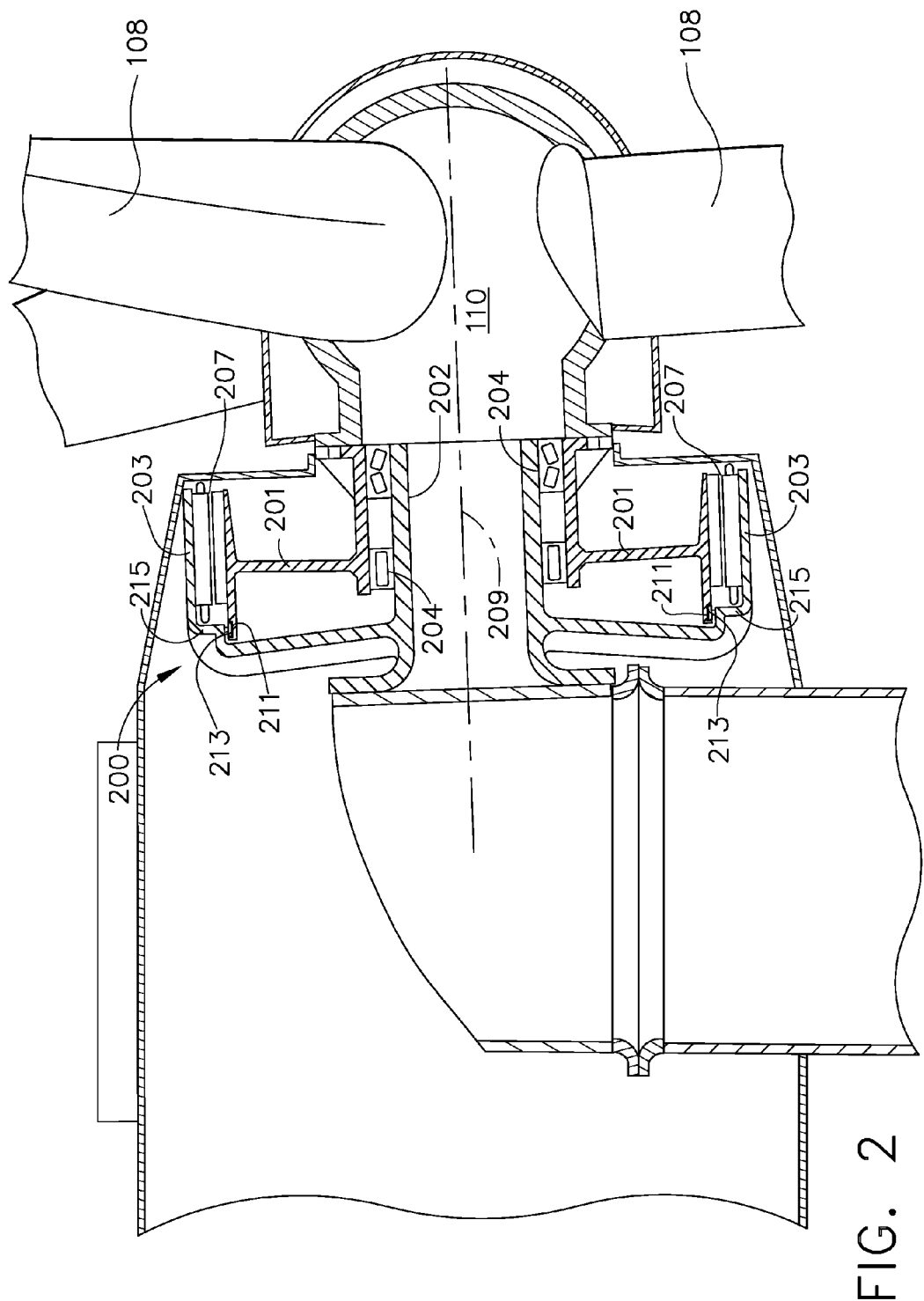
FIG. 2 shows a schematic view according to an embodiment of the present disclosure.

FIG. 2 shows a direct drive generator 200 according to an embodiment of the present disclosure. The direct drive generator 200 includes a rotor 201 mounted to a set of bearings 204 wherein the set of bearings 204 are attached to a shaft 202. The rotor 201 is also in rotational communication to the rotating hub 110, about which the one or more rotor blades 108 rotate. The rotor 201 is further disposed within a stator 203 with an airgap 207 disposed therebetween. The rotor 201 and the stator 203 include a permanent magnet, electromagnetic windings, combinations thereof, or other magnetic devices arranged to provide a magnetic flux across the airgap 207 sufficient to generate electricity. For example, in one method of operation, a magnetic field generated by permanent magnets and/or electromagnets mounted on the rotor 201 passes through the airgap 207 between the rotor 201 to the stator 203. The present disclosure may also include other arrangements of the rotor 201 and the stator 203 and include one or more of the airgaps 207 for inductive generation of electricity.

The passage of the magnetic field through the airgap 207 requires at least some uniformity of the airgap 207. Excessive closure of the airgap 207 and/or non-uniform distances across the airgap 207 decrease power production and may result in operational problems. Furthermore, complete closure of the airgap 207 whereby the rotor physically contacts the stator while rotating can cause significant physical damage and potential catastrophic failure. As shown in FIG. 2, the rotor 201 rotates about a center axis 209. The set of bearings 204 provide support and facilitate rotation of the rotor 201 about the center axis 209. During operation of the wind turbine 100, increases in wind speed (e.g., wind gusts) creating non-uniform forces on the one or more rotor blades 108 and/or the rotating hub 110 may result in deflection of the rotor 201 from the center axis 209, causing non-uniformity in the airgap 207. In addition, other causes, such as gravity sag and electromagnetic (EM) attraction may also contribute to non-uniformity in the airgap 207. Other sources of deflection are ambient and operational temperature swings. These swings can also impact the airgap 207. In addition, an excitation frequency, which is near the natural frequency of the wind turbine 100, may impact the airgap 207. "Deflection", "deflecting", and grammatical variations thereof, as used herein include translational or rotational motion of structural components due to loading applied to the wind turbine 100, particularly variations and deviations from the center axis 209. These sources of deflection can also cause deflection of the stator relative to the center axis 209. Acceptable deflection tolerance of the airgap 207 for example, may include a closing of less than 20%.

The direct drive generator 200 further includes a stator contact surface 211 and a rotor contact surface 213 arranged at an end of a contact arm 215. The stator contact surface 211 and the rotor contact surface 213 are arranged such that the rotor 201 is permitted to rotate within the stator 203. In one embodiment, the stator contact surface 211 and the rotor contact surface 213 are selectively engageable. That is, the stator contact surface 211 and the rotor contact surface 213 engage or are otherwise in contact during deflection of the rotor 201. The engagement of the stator contact surface 211 and the rotor contact surface 213 is preferably a low friction contact to permit continued rotation of the rotor 201, such as by sliding contact or a rolling contact. The engageable surfaces may also be configured so that engagement always occurs, which may reduce dynamic shock in a engageable surface that only contacts only under certain loads. An engageable surface that is always preloaded (i.e., in constant contact) may also allow for easier control of the structural natural frequencies by adjusting stiffness to prevent vibration of the structure near an excitation frequency.

Figure 3:
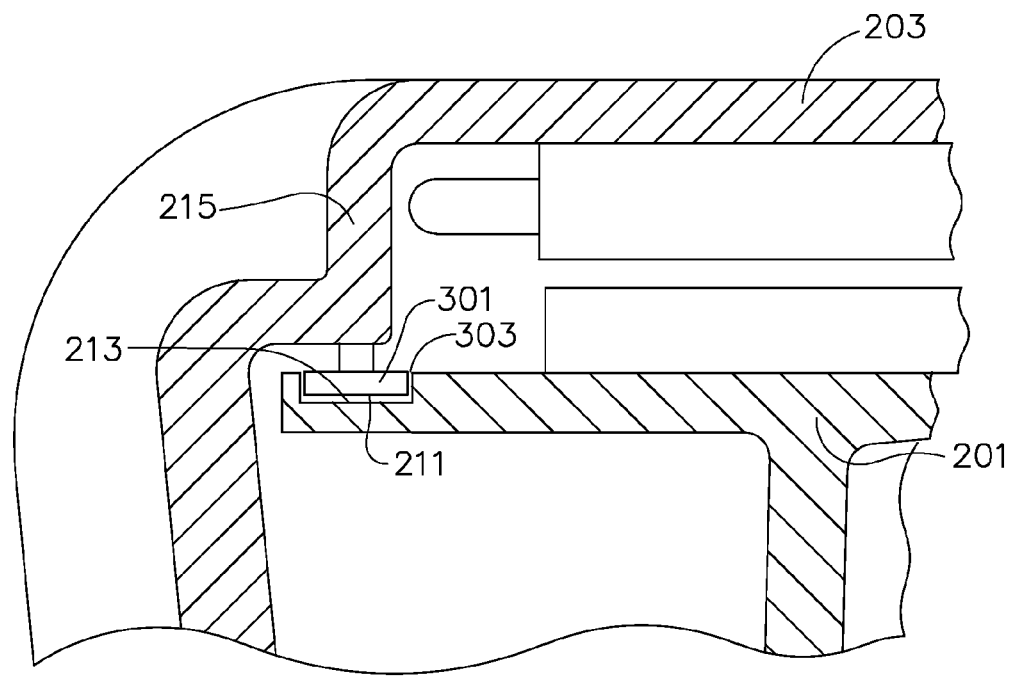
FIG. 3 shows an enlarged view of a portion of a wind turbine generator according to an embodiment of the present disclosure.

As shown in FIG. 3, the stator contact surface 211 and the rotor contact surface 213 are disposed at an end of the contact arm 215, which is affixed to and/or is a portion of the stator 203. The contact arm 215 is preferably arranged and disposed with sufficient strength to withstand forces associated with deflection of the rotor 201. The contact arm 215 sufficiently reacts to the force provided by the rotor 201 to maintain substantial uniformity of the airgap 207. In addition, the contact arm 215 may be configured to permit deflection or elastic deformation in order to react to force provided by deflecting the rotors 201. The stator contact surface 211 and rotor contact surface 213 are preferably configured to provide an alternate load path for the rotor 201 to transfer the load to the stator 203. In addition, the stator contact surface 211 and rotor contact surface 213 interface provides a means to better couple the rotor/stator deflections such that they move in the same general direction. The stator contact surface 211 includes a set of internal bearings 301 attached to a rod or a post fixed to the stator 203. Optionally, a channel 303 for the airgap 207 can be configured to engage a contact roller or the low friction bar 401 (not shown in FIG. 3) under sufficiently high loads. The contact rollers are comprised of the set of wheels or rollers 301 having internal bearings wherein the internal bearings are comprised of individual bearings any bearing type including, roller bearings, ball bearings or any other bearing structure that permits rolling contact. In one embodiment the set of wheels or rollers 301 having internal bearings are disposed circumferentially about the stator 203 to provide support along the periphery of the rotor 201 during deflection. While the embodiment shown in FIG. 3 includes the set of wheels or rollers 301 having internal bearings affixed to the stator 203 and the channel 303 on the rotor 201, the set of wheels or rollers 301 having internal bearings may be positioned on the rotor 201 and the channel 303 may be positioned on the stator 203.

Figure 4:
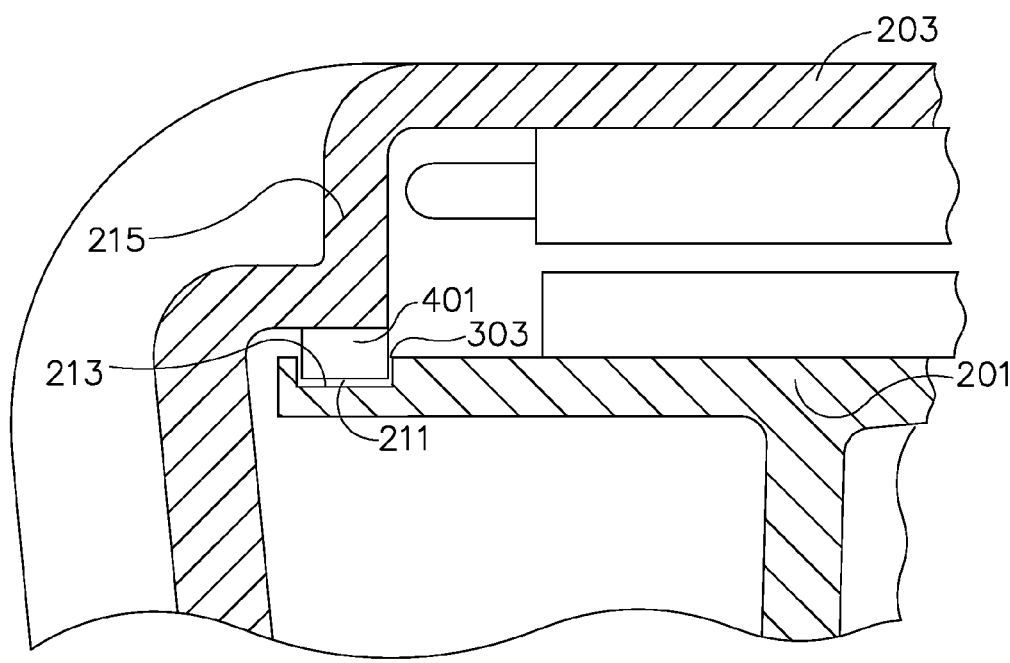
FIG. 4 shows an enlarged view of a portion of the wind turbine generator according to another embodiment of the present disclosure.

As shown in FIG. 4, the stator contact surface 211 and the rotor contact surface 213 are disposed at an end of the contact arm 215, which is affixed to and/or is a portion of the stator 203, substantially as shown in FIG. 3. The stator contact surface 211 includes a low friction bar 401. The rotor contact surface 213 includes the channel 303 configured to receive the low friction bar 401. The low friction bar 401 includes a stator contact surface 211, which is slidable and which provides sliding contact and engagement with the channel 303 upon the rotor 201 being deflected. The low friction bar 401 may be a low friction material or coating or may include lubricant or lubricant systems to maintain a low coefficient of friction. In one embodiment, the low friction bar 401 would be continuous around the circumference of the machine to maximize surface area and to minimize non-uniform wear patterns. In yet another embodiment, plurality of the low friction bars 401 are disposed circumferentially about the stator 203 to provide support along the periphery of the rotor 201 during deflection. While the embodiment shown in FIG. 4 includes the low friction bar 401 affixed to the contact arm 215 of the stator 203 and the channel 303 on the rotor 201, the low friction bar 401 may be positioned on the rotor 201 and the channel 303 may be positioned on the stator 203. FIG. 4 depicts a simplified embodiment not including the rod or post or internal bearing.

While the above embodiments show the rotor contact surface 213 as including the channel 303, the rotor contact surface is not so limited any may include planar surfaces or surfaces having geometries other than channel geometries. In addition, while the above has been shown with respect to the contact arm 215 and the stator contact surface 211 and the rotor contact surface 213 at an end of the rotor 201 and the stator 203, the contact arm 215 and the stator contact surface 211 and the rotor contact surface 213 may be positioned in any location that is capable of receiving the rotor 201, as deflected, maintaining the airgap 207 as substantially uniform. The contact arm 215 can be in several configurations. While the above have been shown with respect to contact arms 215 being a portion of the stator 203, the contact arms 215 may be extensions or protrusions from the stator 203 extending to a stator contact surface 211 for selective engagement with the stator contact surface 213.

Figure 5:
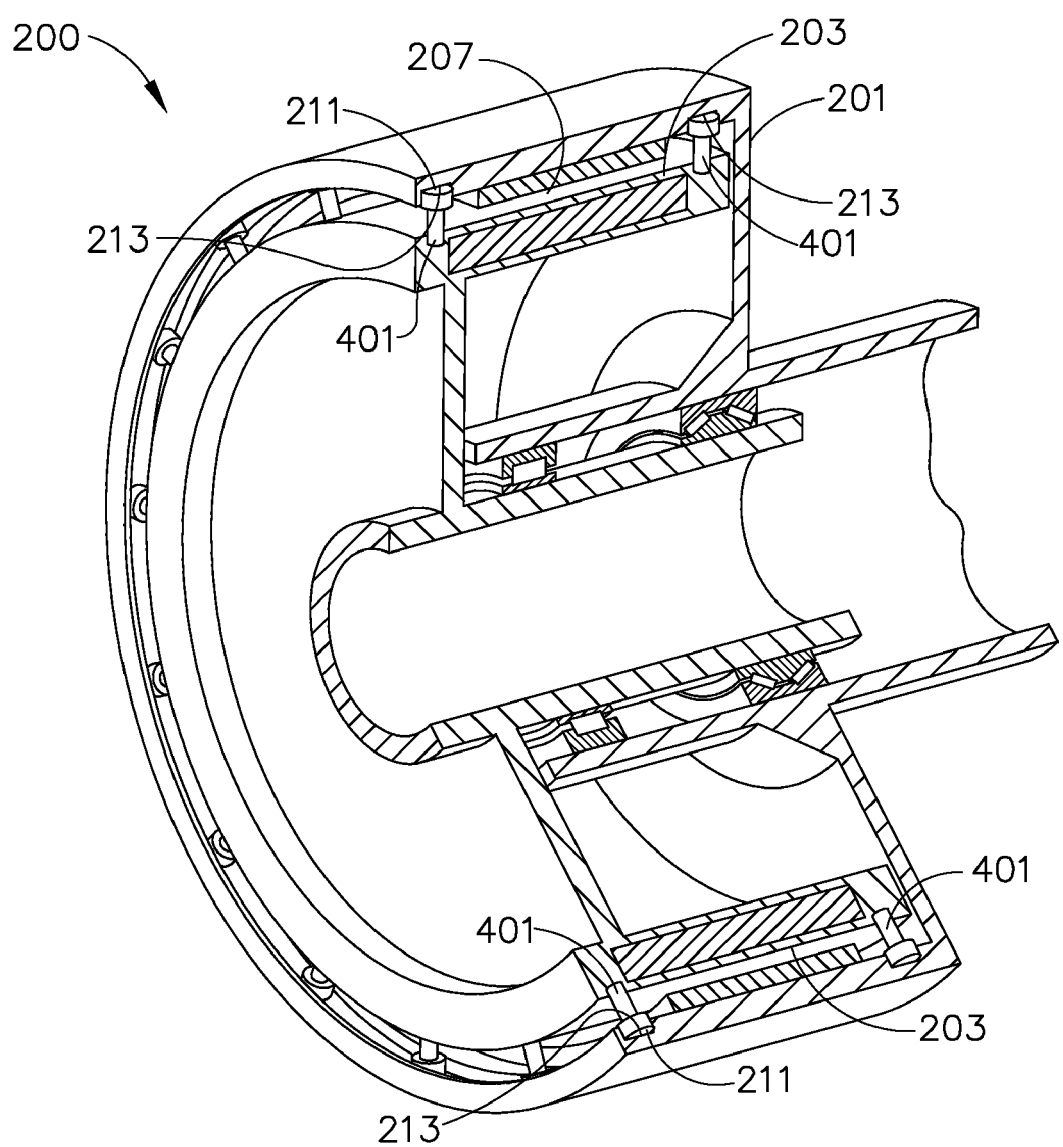
FIG. 5 shows a cutaway perspective view of a direct drive generator according to another embodiment of the present disclosure.

This FIG. 5 shows a cutaway perspective view of a direct drive generator 200 according to an embodiment of the disclosure. As shown in FIG. 5, the rotor 201 and the stator 203 can be oriented with the stator 203 being inside of the rotor 201. The rotor contact surface 213 and the stator contact surface 211 can be on the opposite side of the rotor. The stator contact surface 211 includes a low friction bar. The rotor contact surface 213 includes the channel 303 configured to receive the low friction bar 401. The low friction bar 401 includes a stator contact surface 211, which is slidable and which provides sliding contact and engagement with the channel 303 upon the rotor 201 being deflected. As can be seen in FIG. 5, a plurality of rotor contact surfaces 213 and stator contact surfaces 211 are periodically disposed around the rotor 201 and stator 203, respectively. The low friction bar 401 may be a low friction material or coating or may include lubricant or lubricant systems to maintain a low coefficient of friction.

Figure 6:
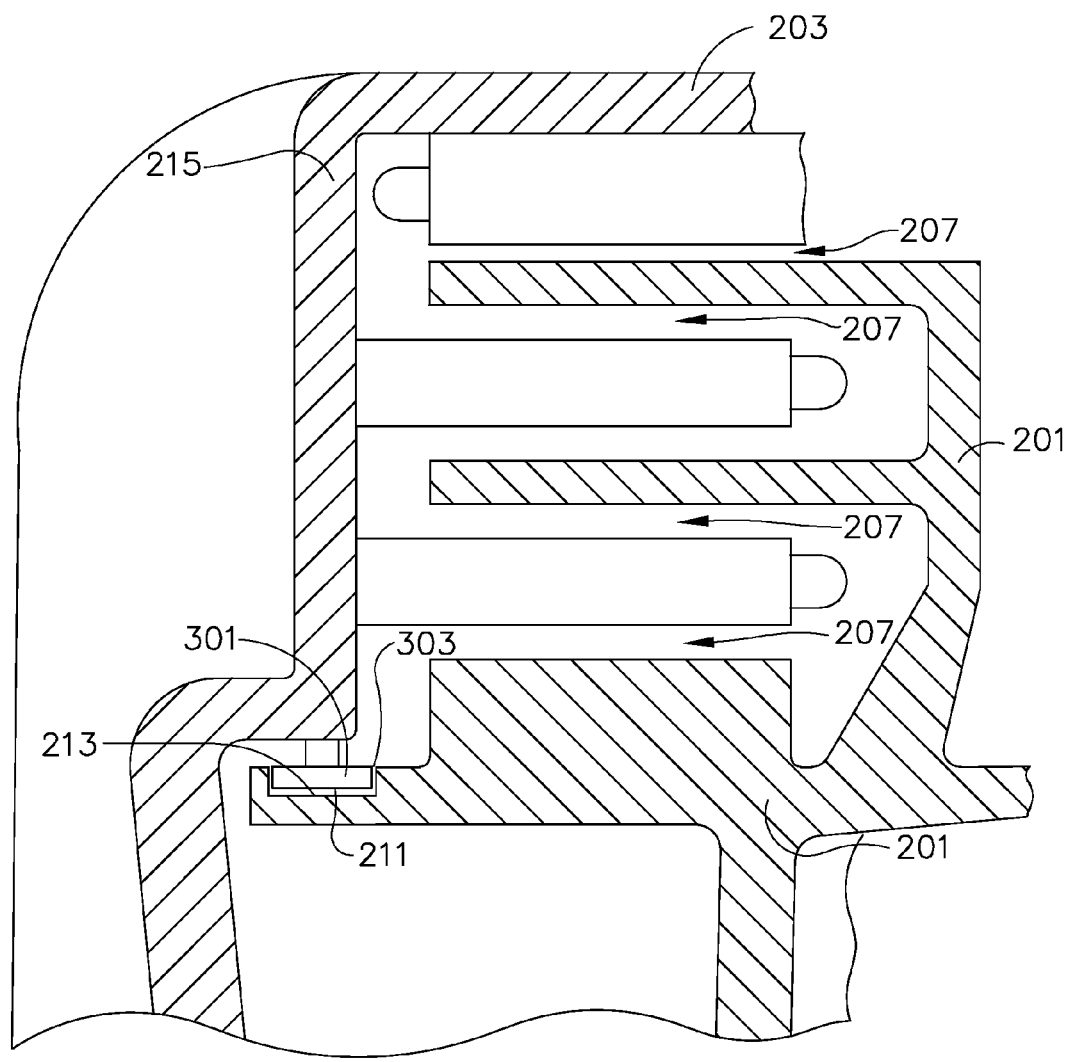
FIG. 6 shows an enlarged view of a portion of a wind turbine generator according to an embodiment of the present disclosure.

FIG. 6 shows an enlarged view of a portion of a wind turbine generator according to an embodiment of the present disclosure. As shown in FIG. 6, multiple airgaps 207 may be present wherein the stator contact surface 211 and the rotor contact surface 213 are disposed at an end of the contact arm 215, which is affixed to and/or is a portion of the stator 203. The stator contact surface 211 includes a set of wheels or rollers 301 having internal bearings attached to a rod or a post fixed to the stator 203. The contact rollers 301 are comprised of the set of internal bearings wherein the internal bearings are comprised of individual bearings any bearing type including, roller bearings, ball bearings or any other bearing structure that permits rolling contact. The multiple airgaps 207 are oriented such that they are between the stators 203 and the rotors 201.

An exemplary embodiment of a wind turbine generator system is described above in detail. The generator components illustrated are not limited to the specific embodiments described herein, but rather, components of each may be utilized independently and separately from other components described herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A wind turbine generator, comprising:
a stator arranged about an axis;
a rotor operably mounted with respect to the stator to generate electricity and rotatably communicating with wind turbine blades rotating substantially about the axis, the rotor and the stator being configured to maintain an airgap therebetween; and
wherein the stator and the rotor have selectively engageable surfaces that maintain the airgap as substantially stable and permit rotation of the rotor during engagement, the engageable surfaces engaging when the rotor deflects to a predetermined amount of deflection; and
wherein the engageable surfaces comprise rollers comprising internal bearings.

2. The wind turbine generator of claim 1, wherein the selectively engageable surfaces permit adjustment of a natural frequency response of the wind turbine generator.

3. The deflection resistant wind turbine generator of claim 1, wherein the selectively engageable surfaces include at least one surface having a channel configured to receive a contact surface.

4. The deflection resistant wind turbine generator of claim 1, wherein a channel is formed on a portion of the rotor.

5. The deflection resistant wind turbine generator of claim 1, wherein the selectively engageable surfaces are periodically disposed around a circumference of the rotor.

6. The deflection resistant wind turbine generator of claim 1, wherein the deflection resistant wind turbine generator is a direct drive wind turbine generator.

7. A method for maintaining a stable airgap in a wind turbine generator, comprising:
   providing the wind turbine generator, comprising:
   a stator arranged about an axis;
   a rotor operably mounted with respect to the stator to generate electricity and rotatably communicating with wind turbine blades rotating substantially about the axis, the rotor and the stator being configured to maintain the airgap therebetween; and
   engaging selectively engageable surfaces to maintain the airgap as substantially stable and permit rotation of the rotor when the rotor deflects to a predetermined amount of deflection;
   wherein the engageable surfaces comprise rollers comprising internal bearings.

8. The method of claim 7, wherein the selectively engageable surfaces adjust a natural frequency response of the wind turbine generator.

9. The method of claim 7, wherein the selectively engageable surfaces include at least one surface having a channel configured to receive a contact surface.

10. The method of claim 7, wherein a channel is formed on a portion of the rotor.

11. The method of claim 7, wherein the selectively engageable surfaces are periodically disposed around the circumference of the rotor.

12. The method of claim 7, wherein the wind turbine generator is a direct drive wind turbine generator.

13. The method of claim 12, wherein the direct drive wind turbine generator provides an alternate load path between the rotor and the stator.

14. The method of claim 7, wherein the selectively engageable surfaces adjust a natural frequency response of the wind turbine generator.

* * * * *